(12) United States Patent  
Maruyama et al.

(10) Patent No.: US 11,204,342 B2  
(45) Date of Patent: Dec. 21, 2021

(54) REFERENCE SAMPLE FOR ANALYSIS

(71) Applicant: SHIMADZU CORPORATION, Kyoto (JP)

(72) Inventors: Fumitaka Maruyama, Kanagawa (JP); Shigehiko Fujimaki, Kanagawa (JP)

(73) Assignee: SHIMADZU CORPORATION, Kyoto (JP)

( * ) Notice: Subject to any disclaimer, the term of this patent is extended or adjusted under 35 U.S.C. 154(b) by 976 days.

(21) Appl. No.: 15/862,789

(22) Filed: Jan. 5, 2018

(65) Prior Publication Data

US 2018/0128793 A1    May 10, 2018

Related U.S. Application Data

(63) Continuation of application No. 14/868,840, filed on Sep. 29, 2015, now abandoned.

(30) Foreign Application Priority Data

Oct. 9, 2014    (JP) ................................. 2014-207865

(51) Int. Cl.
     *G01N 30/72*      (2006.01)
     *G01N 30/04*      (2006.01)
     (Continued)

(52) U.S. Cl.
     CPC ......... *G01N 30/7206* (2013.01); *G01N 30/04* (2013.01); *G01N 30/12* (2013.01);
     (Continued)

(58) Field of Classification Search
     None
     See application file for complete search history.

(56) References Cited

U.S. PATENT DOCUMENTS 3,518,059 A * 6/1970 Levy .................... G01N 30/466  
                                                      436/158  
4,159,894 A * 7/1979 Hu ......................... G01N 30/12  
                                                       422/78  
2006/0008643 A1    1/2006    Lin et al.

FOREIGN PATENT DOCUMENTS

CN      102344624 A      2/2012  
CN      102759471 A     10/2012  
(Continued)

OTHER PUBLICATIONS

Communication dated Feb. 15, 2017, from the State Intellectual Property Office of People's Republic of China in counterpart Application No. 201510640747.8.

(Continued)

*Primary Examiner* — Lyle Alexander  
*Assistant Examiner* — Bryan Kilpatrick  
(74) *Attorney, Agent, or Firm* — Sughrue Mion, PLLC

(57) ABSTRACT

A reference sample for analysis that is optimal for calibration of a pyrolysis gas chromatograph-mass spectrometer and with which precise calibration is always possible by preventing a reference substance from evaporating is provided. A reference sample sheet 1 is provided by distributing a target component or target components with a uniform normality in a base made of a high polymer material, and the reference sample sheet 1 is rolled up so that the target component or target components can be prevented from evaporating from the reference sample sheet 1 even in the case where a component has volatility. A reference sample for calibration of a pyrolysis gas chromatograph-mass spectrometer can be easily, quickly, and efficiently collected by punching out the reference sample sheet 1 using a micropuncher 2.

10 Claims, 2 Drawing Sheets

(51) Int. Cl.
*G01N 30/12* (2006.01)
*H01J 49/00* (2006.01)

(52) U.S. Cl.
CPC . *G01N 2030/042* (2013.01); *G01N 2030/125* (2013.01); *H01J 49/0009* (2013.01)

(56) References Cited

FOREIGN PATENT DOCUMENTS

| CN | 103234787 A | 8/2013 |
| CN | 103697845 A | 4/2014 |
| CN | 103900879 A | 7/2014 |
| JP | 2000-65817 A | 3/2000 |
| JP | 2012-208081 A | 10/2012 |
| JP | 5186362 B2 | 1/2013 |
| JP | 2014-142059 A | 8/2014 |
| WO | 2007/013647 A1 | 2/2007 |

OTHER PUBLICATIONS

Study on the Determination of the Phthalate Esters in Poly(Vinyl Chloride) by Pyrolysis Gas Chromatography/Mass Spectrometry.
Chinese Office Action issued in Chinese Application No. 201510640747.8 dated Sep. 30, 2017.
Japanese Office Action issued in Japanese Application No. P2014-207865; dated Oct. 19, 2017.

* cited by examiner

REFERENCE SAMPLE FOR ANALYSIS

CROSS-REFERENCE TO RELATED APPLICATIONS

This application is a continuation of U.S. application Ser. No. 14/868,840 filed Sep. 29, 2015, which claims priority from Japanese Patent Application No. 2014-207865 filed Oct. 9, 2014, the disclosures of which are incorporated by reference herein in their entirety.

BACKGROUND OF THE INVENTION

1. Field of the Invention

The present invention relates to a reference sample for analysis to be used for calibration or precision control of an analyzer such as a gas chromatograph-mass spectrometer, and in particular, to a reference sample that is appropriate for quantitative analysis of a specific component included in a sample through analysis of a gas generated by heating the sample.

2. Description of Related Art

A gas chromatograph-mass spectrometer is known as a device for identifying a component included in a sample or for quantitating a specific component. A pyrolysis gas chromatograph-mass spectrometer is frequently used for quantitative analysis of a microscopic amount of a component included in a sample, for example, an additive in a high polymer material such as a resin. In such a pyrolysis gas chromatograph-mass spectrometer, a pyrolyzer is arranged in the front stage of an injection port for a sample gas to be subjected to the gas chromatograph so that a gas generated by heating the sample is directly led to the injection port of the gas chromatograph. The pyrolysis gas chromatograph-mass spectrometer is characterized in that a pretreatment of a sample is unnecessary, and a precise quantitative analysis for a specific component from even a microscopic amount of sample is possible.

That is to say, a pyrolysis gas chromatograph-mass spectrometry has such an advantage that a quick analysis is possible even in the case where an extraction process is complicated and requires a long treatment period, or in the case where the extraction is difficult because a pretreatment for separating a target component from a molded item such as solvent extraction is unnecessary.

FIG. 5 shows an example of the configuration of a pyrolysis gas chromatograph-gas spectrometer. The spectrometer in this example is provided with a control unit 11, a pyrolyzer 12 having a heating furnace, a gas chromatograph 13, and a mass spectrometer 14.

The control unit 11 is provided with a personal computer 11a for controlling the entirety and coordinating data processing, and a temperature controller 11b for controlling the temperature of the pyrolyzer 12. The pyrolyzer 12 may be a double-shot pyrolyzer or a multi-shot pyrolyzer, and its operation can be controlled on the basis of a temperature control signal fed from the temperature controller 11b.

The gas chromatograph 13 has such a configuration that a separation column 13b is provided inside an oven 13a, where the separation column 13b communicates with the pyrolyzer 12 through one end so that a gas generated by heating a sample within the pyrolyzer 12 can be led into the separation column 13b.

The other end of the separation column 13b is directly connected to an injection port for a sample of the mass spectrometer 14 so that the gas that has passed through the separation column 13b can be led into the mass spectrometer 14, and thus, analysis is carried out in accordance with the gas chromatograph-mass spectrometry.

Calibration and precision control are necessary for the device in order to quantitate a specific component included in a sample using a gas chromatograph-mass spectrometer such as the above-described pyrolysis gas chromatograph-mass spectrometer, and a reference sample for analysis is indispensable for the calibration and precision control.

In general, a resin pellet or a resin powder, where a reference sample (target component) is distributed in a base of a high polymer material so that the concentration is uniform at a certain level, is used as the reference sample for analysis of a microscopic amount of component such as an additive in a molded resin item (see Patent Document 1).

PRIOR ART DOCUMENT

Patent Document

Patent Document 1: Japanese Unexamined Patent Publication 2012-208081

SUMMARY OF THE INVENTION

Problem to be Solved by the Invention

The conventional state of a reference sample for analysis, that is to say, a resin pellet or a resin powder, assumes a pretreatment for separating a target component from a molded item such as solvent extraction, and thus cannot necessarily be said to be appropriate for the use for calibration or precision control of a pyrolysis gas chromatograph-mass spectrometer with which a sample can be directly analyzed without a pretreatment. The pyrolysis gas chromatograph-mass spectrometer is different from a gas chromatograph-mass spectrometer in that a pretreatment is not necessary for a reference sample. In addition, it is necessary to shave an appropriate microscopic amount off from a resin pellet, for example, using a knife when the resin pellet is used as the reference sample for the pyrolysis gas chromatograph-mass spectrometer.

There is also a problem with these pellet and powder states such that the reference substance (target substance) contained therein easily evaporates from the surface, which lowers the concentration in the case where the reference substance easily evaporates.

The present invention is provided in view of such a situation, and an object thereof is to provide a reference sample for analysis that is optimal for quick analysis using a pyrolysis gas chromatograph-mass spectrometer with which direct analysis is possible without a pretreatment when an additive in a resin material is quantitated, where the reference sample for analysis can prevent the reference substance from evaporating so that precise calibration is possible all the time.

Means for Solving Problem

In order to achieve the above object, the reference sample for analysis according to the present invention is a reference sample to be used for calibration of a quantitative analyzer, with which a target component or target components contained in a sample can be analyzed through gas analysis of a gas generated by heating the sample, and is characterized in that the reference sample is a roll of sheet having: a base made of a high polymer; and a target component or target components distributed in the base in such a manner that the normality is uniform.

In order to achieve the same object, the reference sample for analysis according to a non-limiting embodiment is a reference sample to be used for calibration of a quantitative analyzer, with which a target component or target components contained in a sample can be analyzed through gas analysis of a gas generated by heating the sample, and is characterized in that the reference sample is a sheet, with the sheet being cut into pieces of a predetermined size and the cut pieces being layered on top of each other, having: a base made of a high polymer; and a target component or target components distributed in the base in such a manner that the normality is uniform.

In order to achieve the same object, the reference sample for analysis according to a non-limiting embodiment is a reference sample to be used for calibration of a quantitative analyzer, with which a target component or target components contained in a sample can be analyzed through gas analysis of a gas generated by heating the sample, and is characterized in that the reference sample is a sheet, with both sides, front and rear of the sheet, being coated with a film for evaporation prevention, having: a base made of a high polymer; and a target component or target components distributed in the base in such a manner that the normality is uniform.

An appropriate structure that can be adopted for the inventions according to non-limiting embodiments is one such that each target component is contained with a concentration of 30 mg/kg to 2000 mg/kg.

In non-limiting embodiments, it is desirable for the thickness of the sheet to be 0.05 mm to 1.5 mm, and it is more desirable for the thickness to be 0.1 mm to 1.3 mm.

The sheet in the present specification has flexibility to such an extent that it can be easily rolled up and may be interchangeable with other terms expressing the same properties such as film or tape. That is to say, the term "sheet" in the present specification covers all the concepts of the state of a material having flexibility to such an extent that it can be easily rolled up.

Though it is preferable for the high polymer material used for the base in the present invention to be a thermoplastic high polymer such as polyethylene, polypropylene, or polyvinyl chloride, there is not necessarily a limitation to this as long as it is an organic high polymer.

The present invention has been achieved after acquiring such knowledge that it is most appropriate for the state of a reference sample for analysis to be used for calibration or precision control of a pyrolysis gas chromatograph-mass spectrometer to be a sheet of a reference polymer where a target component or target components (reference component or reference components) is/are distributed uniformly in a base made of a high polymer material, judging from the point of view of the amount of the reference sample and the work of collecting such an amount.

When the reference sample is in a sheet form, a necessary amount of reference sample can be collected easily and efficiently through a single or multiple punching out operation using a micro-puncher or another puncher in order to use the reference sample in sheet form for calibration or precision control of the spectrometer. In addition, the reference sample in sheet form can be rolled up, cut into pieces of an appropriate size so that the pieces are layered on top of each other, or coated with an appropriate film for evaporation prevention on the two sides, front and rear, of the sheet, and thus, the target component or target components contained in the reference sample can be prevented from evaporating even in the case where the component or the components has/have volatility.

Judging from the amount used for a single calibration or a single precision control operation, the area of the sheet to be punched out by means of a micro-puncher or another puncher as well as the operability of the puncher, and the ease of handling of the sheet, it is preferable for the thickness of the reference sample in sheet form in the present invention to be in a range from 0.05 mm to 1.5 mm. Judging from the points of view of the amount of reference sample used for a single calibration operation and the ease of work, it is more preferable for the thickness to be in a range from 0.1 mm to 1.3 mm as described below.

When the size (diameter) of the hole punched out by the puncher is 1 mm to 3 mm judging from the ease of work for punching and it is calculated that an amount of sample for a single calibration or precision control operation can be collected in a single or double punching operation, the thickness of the reference sample in sheet form should be 0.1 mm to 1.3 mm because the amount of sample for a single calibration or precision control operation is generally 0.5 mg to 1.0 mg.

Effects of the Invention

According to the present invention, a high polymer material where a target component or target components is/are distributed with a uniform normality is stretched into a thin sheet, and the sheet is rolled up, cut into pieces of an appropriate size so that the pieces are layered on top of each other, or coated with a film for evaporation prevention on the two sides, front and rear, of the sheet, and therefore, the target component or the target components can be effectively prevented from evaporating even in the case where the target component or target components has/have volatility. In addition, an amount of a reference sample that is necessary for calibration or precision control of the spectrometer can be easily collected through a single or multiple punching out operation using a micro-puncher or another puncher, and therefore, a pyrolysis gas chromatograph-mass spectrometer with which a sample can be directly analyzed without a pretreatment can be efficiently calibrated.

DETAILED DESCRIPTION OF EMBODIMENTS

Figure 1A:
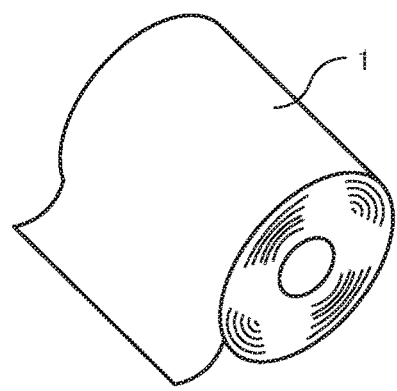
FIG. 1(A) is a diagram showing the appearance of an embodiment of the present invention.
Figure 1B:
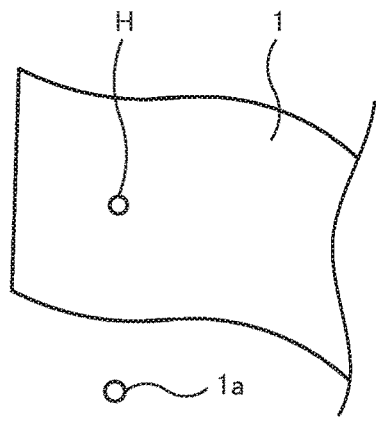
FIG. 1(B) is a diagram showing a state where a sheet has been punched out by means of a micro-puncher.

In the following, the embodiments of the present invention are described in reference to the drawings. FIG. 1(A) is a diagram showing the appearance of an embodiment of the present invention. FIG. 1(B) is a diagram illustrating how a reference sample to be used for calibration is collected by punching out a certain point of the sheet of the embodiment.

In this example, a number of phthalate esters, which are target components, are uniformly distributed in a base of a highly dense polyethylene with a prescribed concentration, and the base is stretched into a thin sheet having a thickness of 0.2 mm and a width of 40 mm, and thus, a reference sample sheet 1 is fabricated and 10 meters of this sheet is rolled up to such a state as shown in FIG. 1(A). Two types of sheets where the concentrations of the target component are 100 mg/kg and 1000 mg/kg are prepared so that these two types can be used as reference samples for span calibration.

When the standard sample sheet 1 is rolled up as described above, the front and rear surfaces make close contact with each other, except the outermost portion, and therefore, this state can prevent the target components from evaporating even when the target components have volatility.

When such a reference sample for analysis is used for calibration or precision control of a spectrometer, as shown in FIG. 1(B), the end portion of the roll of the reference sample sheet 1 is unwound, and a portion that was rolled inside the portion of the roll that is exposed to the outside is cut out and a circle is punched out from this using the below-described micro-puncher, and thus, a punched-out piece 1a is collected. Here, the symbol H in the figure denotes a hole created after the punching out operation.

Figure 2A:
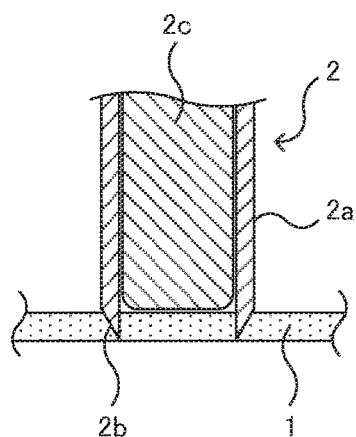
FIGS. 2(A) and 2(B) are diagrams illustrating an operation of a micro-puncher in order to prepare a reference sample.
Figure 2B:
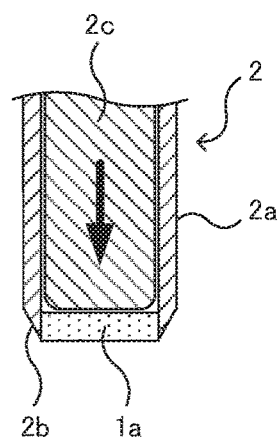

FIGS. 2(A) and 2(B) are diagrams showing an enlarged end portion of a micro-puncher and illustrating how the reference sample sheet 1 is punched out by the micro-puncher. The micro-puncher 2 in this example has such a structure that a punching blade 2b is formed at the end of a circular outer cylinder 2a, and a pushing rod 2c is provided inside the outer cylinder 2a so as to be freely displaceable in the axial directions and remains stationary near the top when being pulled by a coil spring (not shown).

Figure 5:
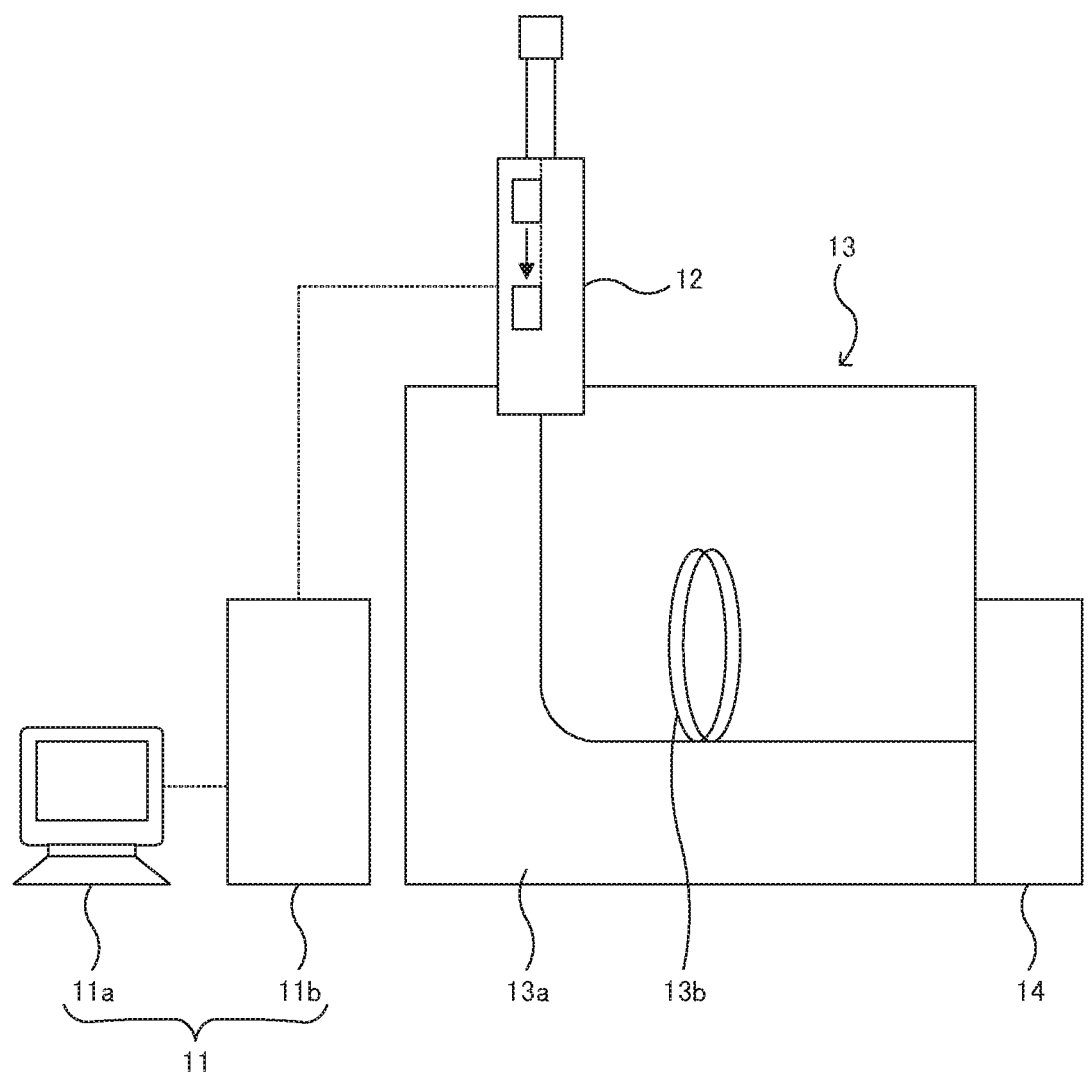
FIG. 5 is a diagram showing the configuration of an example of a pyrolysis gas chromatograph-mass spectrometer.

In the punching operation, as shown in FIG. 2(A), the punching blade 2b of the outer cylinder 2a is forced into the reference sample sheet 1 in a state where the pushing rod 2c is located near the top so that the resulting punched-out piece 1a is in such a state that it stays inside the outer cylinder 2a. When a resisting force is applied to the pulling force of the coil spring so that the pushing rod 2c is displaced downwards, as shown in FIG. 2(B), the punched-out piece 1a is pushed out of the outer cylinder 2a. When this operation has been carried out once or repeated a number of times, a reference sample for calibration or precision control of the pyrolysis gas chromatograph-mass spectrometer in FIG. 5 can be collected, and thus, the reference sample can be efficiently collected with an extremely simple operation.

Figure 3:
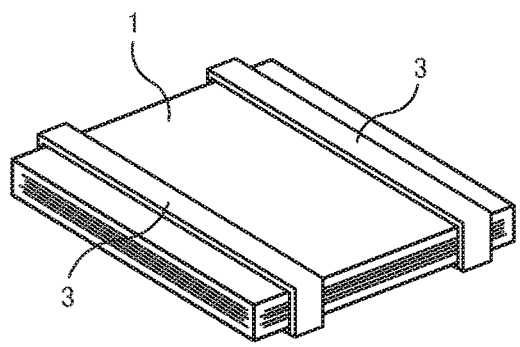
FIG. 3 is a diagram showing the appearance of another embodiment of the present invention.

FIG. 3 is a diagram showing the appearance of another embodiment of the present invention. In this example, the same reference sample sheet 1 as in FIGS. 1(A) and 1(B) is cut into pieces of an appropriate size, and the pieces are layered on top of each other and bound by flexible binders 3 such as rubber in two places. The sheet pieces may be bound by a rubber binder in one place. This structure also allows each cut piece of the reference sample sheet 1 to make close contact with the other pieces on the front and rear, except the sheet pieces in the uppermost and lowermost layers, and therefore, a volatile target component can be prevented from evaporating even when such a component is included. In addition, the sample can be collected from a sheet piece other than the sheet pieces in the uppermost and lowermost layers using a micro-puncher in the same manner as in the above-described example.

Figure 4:
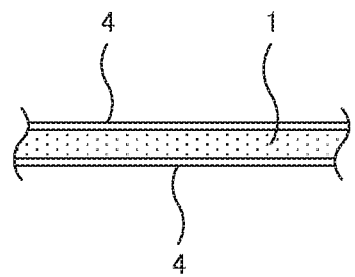
FIG. 4 is a cross-sectional diagram showing the appearance of still another embodiment of the present invention.

FIG. 4 is a cross-sectional diagram showing still another embodiment of the present invention. This example relates to a structure where the same cut pieces of an appropriate size of the reference sample sheet 1 as in FIG. 3 are coated with a film for evaporation prevention 4 on the two sides, front and rear. The material of the film for evaporation prevention 4 is not particularly limited as long as it is a resin through which a volatile component cannot pass, and this film for evaporation prevention 4 is made to make close contact with the two sides, front and rear, of the reference sample sheet 1. The state of close contact may be maintained through pressure from the two sides, front and rear, by means of a clip or the like if necessary. In this example as well, a volatile component can be prevented from evaporating from the reference sample sheet 1 in the case where such a component is included. In addition, a sample can be collected through punching out from the sheet after the film for evaporation prevention 4 has been removed from the front and the rear using a micro-puncher in the same manner as in the previous examples.

EXPLANATION OF SYMBOLS

1 Reference sample sheet
1a Punched-out piece
2 Micro-puncher
2a Outer cylinder
2b Punching blade
2c Pushing rod
3 Binder
4 Film for evaporation prevention
11 Control unit
12 Pyrolyzer
13 Gas chromatograph
14 Mass spectrometer

What is claimed is:

1. A method for a pyrolysis gas chromatograph-mass spectrometer, where a pyrolyzer is arranged in a front stage of an injection port for a sample gas to be subjected to a gas chromatograph so that a gas generated by heating a sample in the pyrolyzer is introduced through the injection port of the gas chromatograph so as to pass through a separation column and then be led to a mass spectrometer for analysis, the method comprising:
    forming a reference sample sheet where at least one target component is distributed in a base made of a high polymer in such a manner that the normality is uniform;
    calibrating the pyrolysis gas chromatograph-mass spectrometer, the calibrating comprising:
        taking a necessary amount of the reference sample sheet for calibration at the time of the calibration, wherein the necessary amount of the reference sample sheet is taken by using a puncher to punch out the necessary amount from the reference sample sheet; and
        performing a direct analysis, without solvent extraction, of the reference sample sheet by heating the necessary amount of the reference sample sheet in the pyrolyzer; and
    analyzing, by the pyrolysis gas chromatograph-mass spectrometer, an unknown sample based on a result of the calibrating.

2. The method for the pyrolysis gas chromatograph-mass spectrometer according to claim 1, wherein the reference sample sheet is a sheet roll before taking the necessary amount of the reference sample sheet.

3. The method for the pyrolysis gas chromatograph-mass spectrometer according to claim 1, wherein the reference sample sheet is cut into pieces of an appropriate length so as to be layered on top of each other before taking the necessary amount of the reference sample sheet.

4. The method for the pyrolysis gas chromatograph-mass spectrometer according to claim 1, wherein the reference sample sheet is coated with a film for evaporation prevention on a front side and a rear side of the reference sample sheet before taking the necessary amount of the reference sample sheet.

5. The method for the pyrolysis gas chromatograph-mass spectrometer according to claim 1, wherein the reference sample sheet contains a target component of the at least one target component with a concentration of 30 mg/kg to 2000 mg/kg.

6. The method for the pyrolysis gas chromatograph-mass spectrometer according to claim 1, wherein the reference sample sheet has a thickness in a range from 0.1 mm to 1.3 mm.

7. The method for the pyrolysis gas chromatograph-mass spectrometer according to claim 1, wherein the using the puncher comprises punching out the necessary amount from the reference sample sheet such that a hole is formed in the reference sample sheet.

8. The method for the pyrolysis gas chromatograph-mass spectrometer according to claim 7, wherein the puncher includes a punching blade and a pushing body that are configured to punch out the necessary amount from the reference sample sheet.

9. The method for the pyrolysis gas chromatograph-mass spectrometer according to claim 2, further comprising unrolling at least a portion of the sheet roll before taking the necessary amount of the reference sample sheet from the portion of the sheet roll.

10. The method for the pyrolysis gas chromatograph-mass spectrometer according to claim 4, further comprising removing the film before taking the necessary amount of the reference sample sheet.

* * * * *